(12) United States Patent  
Kim et al.

(10) Patent No.: US 9,130,203 B2  
(45) Date of Patent: Sep. 8, 2015

(54) LITHIUM ION BATTERY OF CRIMPING SHAPE OF INCREASED SAFETY

(75) Inventors: Sungjong Kim, Daejeon (KR); Jaehan Jung, Daejeon (KR); BongTae Kim, Daejeon (KR); Hong-Jeong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 922 days.

(21) Appl. No.: 12/518,561

(22) PCT Filed: Nov. 7, 2007

(86) PCT No.: PCT/KR2007/005594  
§ 371 (c)(1),  
(2), (4) Date: Sep. 25, 2009

(87) PCT Pub. No.: WO2008/072841  
PCT Pub. Date: Jun. 19, 2008

(65) Prior Publication Data  
US 2010/0021812 A1  Jan. 28, 2010

(30) Foreign Application Priority Data

Dec. 11, 2006 (KR) .................. 10-2006-0125222

(51) Int. Cl.  
*H01M 2/00* (2006.01)  
*H01M 2/04* (2006.01)  
(Continued)

(52) U.S. Cl.  
CPC ........ *H01M 2/0413* (2013.01); *H01M 10/0525* (2013.01); *H01M 2/022* (2013.01); *H01M 10/058* (2013.01); *Y02E 60/122* (2013.01)

(58) Field of Classification Search  
CPC ............ H01M 2/0408; H01M 2/0413; H01M 10/525; H01M 10/058

USPC .......................................... 429/163, 174, 185  
See application file for complete search history.

(56) References Cited

U.S. PATENT DOCUMENTS 4,656,736 A   4/1987  Volkhin et al.  
5,150,602 A   9/1992  Payne et al.  
(Continued)

FOREIGN PATENT DOCUMENTS

EP   0 975 030 A1   1/2000  
JP   63-298958 A   12/1988  
(Continued)

OTHER PUBLICATIONS

Machine Translation of JP 2006-286561.*  
Machine Translation of KR 2006-097486.*

*Primary Examiner* — Milton I Cano  
*Assistant Examiner* — Stephen Yanchuk  
(74) *Attorney, Agent, or Firm* — Birch, Stewart, Kolasch & Birch, LLP

(57) ABSTRACT

A cylindrical battery has a crimp region is formed at the upper end of the container. The upper end of the crimp region is gently bent to surround a gasket located at the inside of the crimp region. A bent front end is continuously bent twice to press the gasket, while the bent front end extends inward, such that a radius of curvature (R1) of the first bent area is less than a radius of curvature (R2) of the second bent area. The upper end of the crimp region of the cylindrical container is continuously bent twice in a predetermined condition. Consequently, when external physical impacts are applied to the battery, and when the internal pressure of the battery increases, the sealed portions are restrained from being separated from each other, thereby preventing the leakage of an electrolyte and thus greatly improving the safety of the battery.

8 Claims, 2 Drawing Sheets

(51) Int. Cl.
*H01M 10/0525* (2010.01)
*H01M 2/02* (2006.01)
*H01M 10/058* (2010.01)

(56) References Cited

U.S. PATENT DOCUMENTS

| | | | |
|---|---|---|---|
| 5,783,326 A | 7/1998 | Hasebe | |
| 6,451,473 B1 | 9/2002 | Saito et al. | |
| 6,811,920 B2 | 11/2004 | Murashige et al. | |
| 2004/0157120 A1* | 8/2004 | Wu et al. | 429/174 |
| 2006/0188779 A1* | 8/2006 | Yoppolo et al. | 429/174 |

FOREIGN PATENT DOCUMENTS

| | | | |
|---|---|---|---|
| JP | 64-032678 A | | 2/1989 |
| JP | 02-207449 A | | 8/1990 |
| JP | 6-251758 A | | 9/1994 |
| JP | 2000-285873 A | | 10/2000 |
| JP | 2000-306557 A | | 11/2000 |
| JP | 2003-6557 A | | 1/2003 |
| JP | 2006-286561 | * | 10/2006 |
| KR | 2006-097486 | * | 3/2005 |
| KR | 10-0601521 B1 | | 7/2006 |
| KR | 10-2006-0097481 B1 | | 9/2006 |
| KR | 10-2007-0093171 A | | 9/2007 |
| WO | 01/09967 A1 | | 2/2001 |

* cited by examiner

LITHIUM ION BATTERY OF CRIMPING SHAPE OF INCREASED SAFETY

FIELD OF THE INVENTION

The present invention relates to a crimp-shaped secondary battery with increased safety, and, more particularly, to a cylindrical secondary battery constructed in a structure in which a crimp region, at which a cap assembly is mounted to an open upper end of a cylindrical container having an electrode assembly mounted therein, is formed at the upper end of the container, wherein the crimp region is constructed in a structure in which the upper end of the crimp region of the cylindrical container is continuously bent twice with predetermined radii of curvature, and therefore, when external physical impacts, such as vibration or dropping, are applied to the battery, and when the internal pressure of the battery increases, the sealed portions are restrained from being separated from each other, thereby preventing the leakage of an electrolyte and thus greatly improving the safety of the battery, and the deformation of the container, such as wrinkles, is minimized when bending the front end of the crimp region with a small radius of curvature.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having a high energy density and a high discharge voltage, on which much research has been carried out and which is now commercialized and widely used.

When the secondary battery is used as a power source for mobile phones or laptop computers, it is required for the secondary battery to stably provide a predetermined level of power. On the other hand, when the secondary battery is used as a power source for power tools, such as electric drills, it is required for the secondary battery to instantaneously provide a high level of power and, at the same time, be stable against external physical impacts, such as vibration or dropping.

FIG. 1 is a vertical sectional view illustrating the structure of a conventional cylindrical secondary battery.

Referring to FIG. 1, the cylindrical secondary battery 10 generally includes a cylindrical container 20, a jelly-roll type electrode assembly 30 mounted in the container 20, a cap assembly 40 coupled to the upper end of the container 20, and a crimp region 50 at which the cap assembly 40 is mounted.

The electrode assembly 30 is constructed in a structure in which cathodes 31 and anodes 32 are wound in a jelly-roll shape while separators 33 are respectively interposed between the cathodes 31 and the anodes 32. To the cathodes 31 is attached a cathode tab 34, which is connected to the cap assembly 40. To the anodes 32 is attached an anode tab (not shown), which is connected to the lower end of the container 20.

The cap assembly 40 includes a top cap 41 constituting a cathode terminal, a positive temperature coefficient (PTC) element 42 for intercepting electric current through the great increase of battery resistance when the interior temperature of the battery increases, a bent safety member 43 for intercepting electric current and/or discharge gas when the interior pressure of the battery increases, an insulating member 44 for electrically isolating the bent safety member 43 from a cap plate 45 excluding a specific portion, and the cap plate 45 connected to the cathode tab 34, which is attached to the cathode 31. The cap assembly 40 is constructed in a structure in which the top cap 41, the PTC element 42, the bent safety member 43, the insulating member 44, and the cap plate 45 are sequentially stacked.

The crimp region 50 is formed at the upper end of the container 20 such that the cap assembly 40 can be mounted to the open upper end of the container 20. More specifically, the crimp region 50 is formed by beading the upper end of the container 20, such that a depression 21 is formed at the inside of the container 20, mounting a gasket 60, sequentially inserting the outer circumferential parts of the cap plate 45, the insulating member 44, the bent safety member 43, and the top cap 41, and bending the upper end of the container 20. As a result, the crimp region 50 is formed in the shape to surround the gasket 60 located at the inside of the crimp region 50. The cap assembly 40 is mounted at the crimp region 50 by crimping and pressing.

However, it has been proven that, when external impacts are applied to the cylindrical secondary battery with the above-stated construction, the sealability of the cylindrical secondary battery is lowered, the resistance at the electrical connection regions of the cylindrical secondary battery is changeable, and the safety of the cylindrical secondary battery is lowered, whereby it is difficult for the cylindrical secondary battery to exhibit desired battery performance.

For this reason, the inventors of the present invention proposed a secondary battery having an improved structure as shown in FIG. 2, which is disclosed in Korean Patent Application No. 2006-22950.

Referring to FIG. 2, the cylindrical secondary battery 100 is manufactured by inserting an electrode assembly 110 into a container 200, injecting an electrolyte into the container 200, and mounting a cap assembly 300 to the upper end, which is open, of the container 200. The process for manufacturing the cylindrical secondary battery 100 is generally identical to the process for manufacturing the conventional cylindrical secondary battery. However, the structure of the cylindrical secondary battery 100 is different from that of the conventional cylindrical secondary battery. The difference will be described below in detail.

The cap assembly 300 is mounted to the open upper end of the container 200 by a crimp region 500 constructed in a structure in which a top cap 310 and a bent safety member 320 for lowering the interior pressure of the battery are in tight contact with each other inside a gasket 400 mounted to an upper beading part 210 of the container 200 for maintaining airtightness. The top cap 310 is formed such that the central part of the top cap 310 protrudes upward, and therefore, the top cap 310 serves as a cathode terminal, to which an external circuit is connected. The top cap 310 is provided along the circumference of the protruding part thereof with a plurality of through-holes 312, through which pressurized gas is discharged out of the container 200.

The bent safety member 320 is a thin-film structure through which electric current flows. The central part of the bent safety member 320 is depressed to form a depressed central part 322, and two notches 324 and 326 having different depths are formed at upper and lower bent regions of the central part 322, respectively. Below the bent safety member 320 is mounted a current intercepting member 600 for discharging gas out of the battery and, at the same time, intercepting electric current.

The end 328 of the bent safety member 320 surrounds the outer circumference 314 of the top cap 310, and an annular protrusion 316 is formed at the lower end surface of the top cap 310.

The cylindrical secondary battery 100 with the above-stated construction solves the sealability-related problem and the resistance change problem at the electrical connection regions. However, the experiments carried out by the inventors of the present invention revealed that, when external impacts are continuously applied to the cylindrical secondary battery, the crimp region constructed in the structure of FIG. 1 as well as the crimp region constructed in the structure of FIG. 2 is easily deformed, with the result that the contact surfaces between the top cap, the bent safety member, and the gasket are separated from each other, whereby the sealability of the cylindrical secondary battery is lowered.

FIG. 3 is a partially enlarged view illustrating the crimp region of the cylindrical secondary battery shown in FIG. 2. For convenience of description, only the section of the container forming the crimp region is illustrated.

Referring to FIG. 3, the crimp region 500 is constructed in a structure in which the end of the crimp region 500 is bent such that the cap assembly 300 (see FIG. 2) is stably mounted to the open upper end of the container 200 (see FIG. 2) while the gasket 400 (see FIG. 2) is disposed between the cap assembly 300 and the open upper end of the container 200. A bent front end 510 of the crimp region 500 extends inward while the bent front end 510 of the crimp region 500 is inclined in a predetermined angle such that the bent front end 510 of the crimp region 500 presses the gasket 400 (see FIG. 2) to provide a high sealability. For most cylindrical secondary batteries, the bent region has a radius of curvature (R) of approximately 1.3 mm or more.

In this structure, however, when an external force is applied frequently to the side of the battery (in the direction indicated by a horizontal arrow), the crimp region 500 is deformed in the shape of a dotted line, with the result that the sealed state of the gasket is partially released, and therefore, the contact surfaces between the bent safety member and the top cap are instantaneously spaced apart from each other. As a result, an electrolyte leaks from the cylindrical secondary battery through the gap defined between the bent safety member and the top cap, whereby the safety of the cylindrical secondary battery is greatly lowered. Also, when the internal pressure of the cylindrical secondary battery increases, the above-mentioned deformation occurs due to the pressure applied from the inside of the cylindrical secondary battery, with the result that the electrolyte leaks from the cylindrical secondary battery.

It may be considered to decrease the radius of curvature, when a bending process for crimping is carried out, in order to restrain the deformation of the crimp region due to the external impacts applied to the cylindrical secondary battery and the increase of the internal pressure of the cylindrical secondary battery. In this case, however, the bent region does not slop gently due to the small radius of curvature, with the result that wrinkles may formed at the container.

Also, it may be considered to bend the front end of the crimp region, such that the bent front end of the crimp region presses approximately perpendicularly against the gasket, in order to greatly increase a force applied to the gasket in the cylindrical battery. An example of the structure is partially disclosed in drawings of U.S. Pat. No. 5,150,602 and No. 4,656,736. When the bent front end of the crimp region presses perpendicularly against the gasket, however, a fatigue phenomenon of the elastic material constituting the gasket greatly increases, whereby cracks may occur due to the external impacts and the increase of the internal pressure, and therefore, the sealability of the cylindrical battery is sharply reduced.

Meanwhile, the outer surface of the container of the cylindrical secondary battery is covered generally by an insulative tube to insulate the outer surface of the container, excluding electrode terminal regions, from the outside and to prevent the outer surface of the container from being damaged by scratches.

The insulative tube has been normally made of poly vinyl chloride (PVC). However, the PVC tube has a low heat resistance, secondary contraction occurs in the PVC tube during the high-temperature treatment of the PVC tube, and noxious substances are generated from the PVC tube when the PVC tube is discarded, with the result that several problems, such as environmental pollution, occurs from the PVC tube. For this reason, the insulative tube is mainly made of other polymer resins instead of the PVC.

However, the experiments carried out by the inventors of the present invention revealed that such a tube has a low impact resistance, and therefore, when an external force is applied to a secondary battery used as a power source for power tools, the tube did not exhibit a desired level of impact absorptivity. Therefore, there is a high necessity for a cylindrical secondary battery exhibiting more excellent characteristics by the improvement of the crimping structure and the insulative tube.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that the leakage of an electrolyte, which may occur due to external small impacts, repeated fatigue, the increase of internal pressure, load, or the like, is effectively prevented through the change in shape of a crimp region of a cylindrical battery. The present invention has been completed based on these findings.

In accordance with the present invention, the above and other objects can be accomplished by the provision of a cylindrical battery constructed in a structure in which a crimp region, at which a cap assembly is mounted to an open upper end of a cylindrical container having an electrode assembly mounted therein, is formed at the upper end of the container, wherein the crimp region is constructed in a structure in which the upper end of the crimp region is gently bent, such that the crimp region surrounds a gasket located at the inside of the crimp region, a bent front end is continuously bent twice to press the gasket, while the bent front end extends inward, such that a radius of curvature ($R_1$) of the first bent area is less than a radius of curvature ($R_2$) of the second bent area at the outer circumference of the container.

Generally, when the cylindrical secondary battery is used as a power source for a power tool, to which internal or external physical impacts, such as vibration or dropping, are frequently applied due to its working environmental characteristics, the vibration from the power tool is directly transmitted to the power supply. As previously described, these physical impacts cause the deformation of the crimp region, with the result that the sealability at the contact surfaces between the top cap, the bent safety member, and the gasket is lowered.

In order to solve the above-mentioned problem, therefore, a structure in which the angle at the crimp region surrounding the gasket is greatly increased from the horizontal plane may be necessary. In this case, however, the crimp region is easily widened upward, as indicated by a vertical arrow, due to the elastic force of the gasket, when an external force is applied to the battery or the internal pressure of the battery increases, with the result that an electrolyte may leak out of the container. Consequently, a structure in which the radius of curvature at the bent area is reduced may be considered. In this case, however, wrinkles may be formed on the container.

According to the present invention, on the other hand, the crimp region is constructed in a structure in which the upper end of the crimp region is continuously bent twice such that the upper end of the crimp region is gently bent, and the radius of curvature ($R_1$) of the first bent area is less than the radius of curvature ($R_2$) of the second bent area at the outer circumference of the container. Consequently, the present invention provides an excellent bending maintenance against small impacts due to vibration of, especially, the power tool, thereby greatly improving the sealing effect between the gasket and the crimp region, i.e., the sealability, and preventing the occurrence of wrinkles on the container due to the small radius of curvature.

The radius of curvature ($R_1$) of the first bent area being less than the radius of curvature ($R_2$) of the second bent area means that the second bent area is bent more gently that the first bent area. The radii of the curvature at the bent areas exhibit remarkable effects, which are not expected in the conventional art, in the structure constructed with the above-defined conditions. The results can be confirmed through examples and comparative examples, which will be described below.

On the other hand, when the crimp region is formed such that the radius of curvature ($R_1$) of the first bent area is greater than the radius of curvature ($R_2$) of the second bent area, the first bent area, which is bent gently, may be easily deformed due to continuous small impacts. Also, the second bent area has a relatively protruding structure, and therefore, when an external force is applied to the battery from above the battery, the impacts concentrate on the second bent area, with the result that the shape of the bent end may be seriously deformed. Furthermore, the contact area between the crimp region and the gasket located inside the crimp region is decreased, and therefore, it is not possible to sufficiently press the gasket. Consequently, the improvement of the sealability of the battery to a desired degree is not accomplished.

In a preferred embodiment, the $R_1$ has a value of 0.4 to 1.5 mm, and the $R_2$ has a value of 3 to 4 mm. When the value of $R_1$ is too large or the value of $R_2$ is too small, the difference between the value of $R_1$ and the value of $R_2$ is greatly reduced, with the result that it is not possible to achieve the bending maintenance to a desired degree, when an external force is applied to the battery or the internal pressure of the battery increases. On the other hand, when the value of $R_1$ is too small, excellent bending maintenance is accomplished against the external force or the internal pressure; however, stress concentrates on the bent area, when the external force is applied to the battery from above the battery, with the result that the corresponding area may crack. According to circumstances, wrinkles may form on the container during the bending process. Also, when the value of $R_2$ is too large, it is not possible for the bent end to effectively press the gasket, and therefore, it is difficult to accomplish a desired sealability.

More preferably, the $R_1$ has a value of 0.5 to 1.4 mm, and the $R_2$ has a value of 3.5 to 3.8 mm.

In a preferred embodiment, the crimp region is constructed such that a rectilinear area is formed between the first bent area and the second bent area. The contact area to absorb external impacts, applied to the battery, is relatively increased by the provision of the rectilinear area. Especially, when impacts are applied to corners of the battery or to the top of the battery, or when the battery drops, the impacts applied to the battery is relatively rapidly dispersed, whereby the safety of the battery is improved.

Time to form the rectilinear area is not particularly restricted. For example, the rectilinear area may be formed naturally when maintaining the radius of curvature ($R_1$) and the radius of curvature ($R_2$) during the first and second bending processes. Alternatively, the rectilinear area may be formed by an additional pressing process after the bending processes.

Also, the length and the inclination of the rectilinear area may be changed depending upon the radius of curvature ($R_1$) of the first bent area being less than the radius of curvature ($R_2$) of the second bent area. That is, the length and the inclination of the rectilinear area are not particularly restricted, and may be appropriately decided according to the relationship between the bent areas and the overall appearance of the battery. In a preferred embodiment, the rectilinear area has a length of 0.1 to 1 cm and an inclination angle of 0 to 20 degrees.

The gasket serves to electrically isolate the bent safety member from the top cap and to seal the interior of the battery. However, when the crimp region, which surrounds the gasket, is deformed, the sealability of the battery is greatly reduced, and therefore, the leakage of the electrolyte from the battery may occur. Consequently, it is very important to prevent the deformation of the crimp region. To this end, the bent front end of the crimp region extends inward such that the bent front end sufficiently presses the gasket while the bent front end prevents the severe deformation of the gasket. Also, the bent front end of the crimp region is inclined by a predetermined angle from the side of the crimp region.

The inward extending length of the bent front end of the crimp region may be appropriately decided in consideration of the mechanical strength of the container and the elastic force and durability of the gasket. In a preferred embodiment, the bent front end of the crimp region extends, by 1 to 3 mm, from the side of the crimp region.

Also, the bent front end of the crimp region may be bent at an angle of 40 to 80 degrees, preferably 60 to 75 degrees, from the sidewall of the crimp region such that the tight contact between the gasket and the crimp region is maintained, and a predetermined pressure is applied to the gasket such that the gasket is pressed. For example, when the front end of the crimp region is bent once with a predetermined radius of curvature, it is difficult to decrease the inclination angle ($\alpha$) to the sidewall of the crimp region to 80 degrees or less due to the elastic force of the gasket. When the front end of the crimp region is continuously bent twice with predetermined radii of curvature according to the present invention, on the other hand, it is possible to maintain the inclination angle ($\alpha$) to the sidewall of the crimp region at 80 degrees or less, whereby the force of the crimp region pressing the gasket is further increased, and therefore, the leakage of the electrolyte is further effectively prevented.

When the inward extending length of the bent front end of the crimp region is too small or the inclination angle of the bent front end of the crimp region is too large, it is not possible to sufficiently press the gasket due to the deformation of the crimp region, and therefore, the electrolyte leakage phenomenon may occur. On the other hand, when the inward extending length of the bent front end of the crimp region is too large or the inclination angle of the bent front end of the crimp region is too small, the bent end of the crimp region excessively presses the gasket, with the result that the gasket may be damaged.

The bending process is not particularly restricted. For example, the bending process may be performed intermittently. Specifically, the bent front end of the crimp region is primarily bent, with the radius of curvature ($R_1$), from the side of the crimp region, such that the bent front end of the crimp region is approximately at a right angle to the central axis of the top cap, and the bent front end of the crimp region is secondarily bent, with the radius of curvature ($R_2$), at an angle of 40 to 80 degrees to the central axis of the top cap, such that the bent end of the crimp region is brought into tight contact with the upper end of the gasket. At this time, the time interval between the primary bending process and the secondary bending process means the slight time interval at which stress is sufficiently dispersed from the bent area where the stress is concentrated when bending. This intermittent bending process greatly reduces a possibility of the bent area breaking.

Preferably, the cylindrical container has a thickness of 0.15 to 0.35 mm. When the thickness of the cylindrical container is too small, the mechanical strength of the battery is inevitably lowered, and a welding defect may occur while the cathode lead is welded to the bottom of the cylindrical container. As a result, the bottom of the cylindrical container may be ruptured or severely damaged when welding. On the other hand, when the thickness of the cylindrical container is too large, the total weight of the battery is increased, and the area of the electrode assembly is relatively reduced, whereby the capacity of the battery is reduced. Also, it is not easy to perform the beading and crimping process at the open upper end of the container.

The material for the cylindrical container is not particularly restricted. Preferably, the cylindrical container is made of one selected from a group consisting of stainless steel, steel, aluminum, and equivalents thereof.

In a preferred embodiment, the outer surface of the cylindrical container, excluding electrode terminals, is covered by an insulative film, and the insulative film is made of a polymer resin exhibiting a high impact absorptivity.

The insulative film is formed, for example, in the shape of a tube. The battery is inserted into the tube, and heat is applied to the tube such that the tube is brought into contact with the outer surface of the battery by thermal contraction. Consequently, the insulative film is not particularly restricted, so long as the insulative film has high thermal contraction, electrical insulation, and impact resistance, although a poly ethylene terephthalate (PET) resin, having a high tensile strength and elongation, is preferably used. Especially, a soft PET resin is more preferably used than a general PET resin because the soft PET resin has a flexibility higher than that of the general PET resin.

The soft PET resin has a high electrical insulation, thermal contraction, and tight contact with the outer surface of the battery. Especially, the soft PET resin is very flexible, and therefore, the soft PET resin exhibits an excellent effect to absorb small impacts. Furthermore, when a mechanical force is applied to the soft PET, the soft PET resin does not embrittle and break, but extends by virtue of its softness, thereby preventing the occurrence of an external short circuit, which may occur when the insulative film cracks or is removed and thus improving the safety of the battery.

Preferably, the battery according to the present invention is used as a power source of a device which is exposed to frequent vibrations and impacts. The device may be a power tool, such as an electric drill, generating very large vibration when in use.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 4:
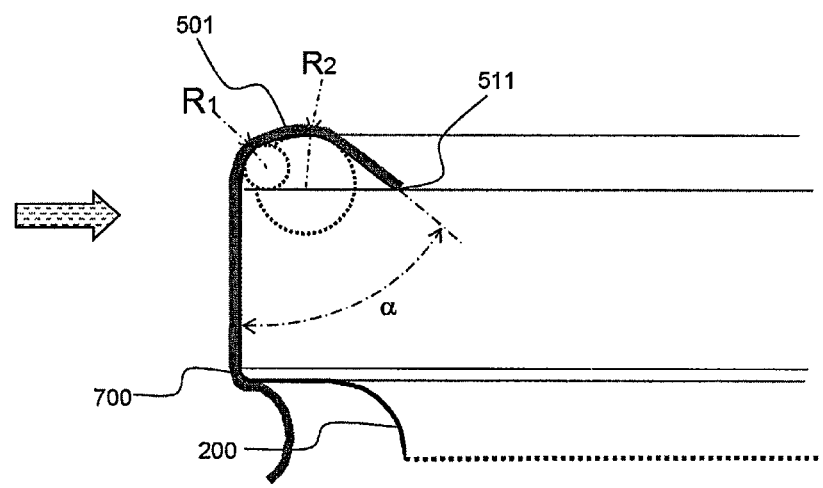
FIG. 4 is an enlarged vertical sectional view illustrating a crimp region of a cylindrical secondary battery according to a preferred embodiment of the present invention.

FIG. 4 is an enlarged vertical sectional view illustrating a crimp region of a cylindrical secondary battery according to a preferred embodiment of the present invention. FIG. 4 illustrates the radius of curvature of the bent area of the crimp region, and the extension shape and angle of the bent front end of the crimp region.

Figure 1:
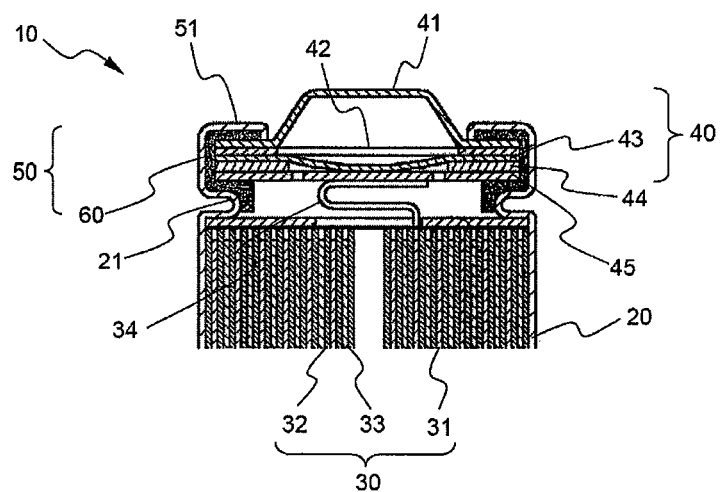
FIG. 1 is a sectional view typically illustrating a representative upper structure of a conventional cylindrical secondary battery.
Figure 2:
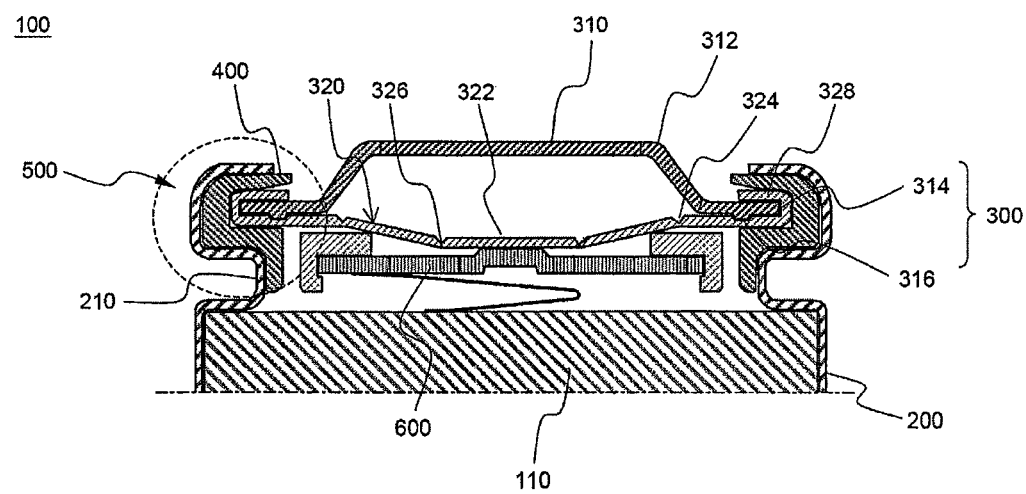
FIG. 2 is a sectional view typically illustrating a cylindrical secondary battery disclosed in Korean Patent Application No. 2006-22950.
Figure 3:
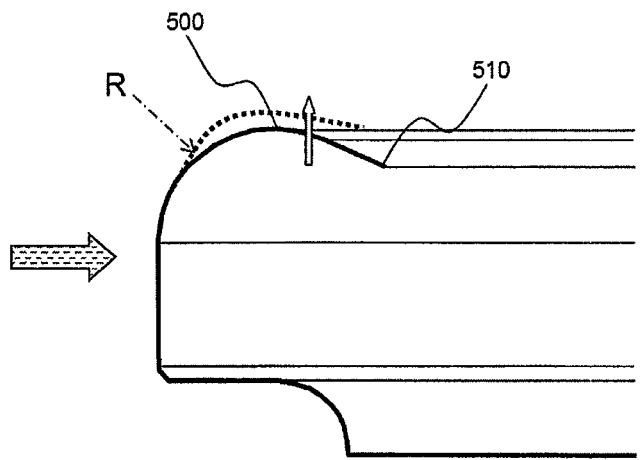
FIG. 3 is an enlarged vertical sectional view of a crimp region shown in FIG. 2.

Referring to FIG. 4, the crimp region 501 is constructed to have a first bent area of a radius of curvature ($R_1$) and a second bent area of another radius of curvature ($R_2$), which are formed successively, unlike the radius of curvature (R) of FIG. 3. The radius of curvature ($R_1$) of the first bent area is less than the radius of curvature ($R_2$) of the second bent area, and is much less than the radius of curvature (R) of FIG. 3. Consequently, the bent front end 511 of the crimp region 501 exhibits a great pressing force against the gasket (not shown) and a high sealability under the condition of the same inward extending length, as compared with the bent front end 510 of the crimp region 500.

Furthermore, the bent area having the small radius of curvature ($R_1$) is deformed a little by an external force applied in the side direction, and therefore, the tight contact between the bent area having the small radius of curvature ($R_1$) and the gasket is not greatly reduced.

The bent front end 511 extends inward while the bent front end 511 is bent at a predetermined angle ($\alpha$) from the side of the crimp region 501. Also, the second bent area having the radius of curvature ($R_2$) is formed at the bent front end 511. As a result, it is possible to lower the inclination angle ($\alpha$) to 80 degrees or less. Consequently, the force pressing against the gasket is further increased, and therefore, the leakage of an electrolyte from the secondary battery is prevented.

On the other hand, when the crimping region is formed only with the first bent area, the bent maintaining force is not great, as previously described, and therefore, it is difficult to lower the inclination angle ($\alpha$) to 80 degrees or less due to the elastic force of the gasket.

Also, the outer surface of the container 200 is covered by an insulative film 700 made of a soft poly ethylene terephthalate (PET) resin exhibiting a high impact absorptivity. The insulative film 700 is brought into tight contact with the outer surface of the container 200 by the thermal contraction, and therefore, the insulative film 700 has a shape corresponding to the external shape of the container 200.

When an external force is applied to the container 200 in the side direction, as indicated by an arrow, the insulative film 700 serves to primarily absorb the impact. Also, the crimp region 500, which are bent continuously twice with the specific radii of curvature ($R_1$ and $R_2$), exhibits a high resistance against the external force, and thus serves to restrain the deformation.

Hereinafter, examples of the present invention will be described in more detail. It should be noted, however, that the scope of the present invention is not limited by the illustrated examples.

EXAMPLE 1

A top cap and a cylindrical container were manufactured using a cold rolled carbon steel sheet (SPCE) coated with nickel (Ni), an electrode assembly was mounted in the cylindrical container, a beading process was carried out to the cylindrical container at an area corresponding to the upper end of the electrode assembly to form a crimp region, a gasket was inserted into the inside of the crimp region, and a cap assembly was mounted at the crimp region. Subsequently, the portion of the crimp region, spaced from the cap assembly, was bent at an angle profile of 65 degrees to the side of the container, such that a first bent area had a radius of curvature ($R_1$) of 0.6 mm, and a second bent area had a radius of curvature ($R_2$) of 3.65 mm. Subsequently, a crimping and pressing process was carried out to manufacture a standard 18650 cylindrical secondary battery (having a diameter of 18 mm and a length of 65 mm). The bent front end of the crimp region extended inward by approximately 2.4 mm from the side of the crimp region.

EXAMPLE 2

A cylindrical secondary battery was manufactured in the same manner as Example 1 except that the first bent area of the crimp region had a radius of curvature ($R_1$) of 1.3 mm, and the second bent area of the crimp region had a radius of curvature ($R_2$) of 3.65 mm.

COMPARATIVE EXAMPLE 1

A cylindrical secondary battery was manufactured according to the same method as Example 1 except that the first bent area of the crimp region had a radius of curvature ($R_1$) of 0.6 mm, and the second bent area of the crimp region had a radius of curvature ($R_2$) of 0 mm (straight). At this time, the occurrence of wrinkles at the container was observed during the first bending process.

COMPARATIVE EXAMPLE 2

A cylindrical secondary battery was manufactured according to the same method as Example 1 except that the first bent area of the crimp region had a radius of curvature ($R_1$) of 1.3 mm, and the second bent area of the crimp region had a radius of curvature ($R_2$) of 0 mm (straight), as shown in FIG. 3.

COMPARATIVE EXAMPLE 3

A cylindrical secondary battery was manufactured according to the same method as Example 1 except that the first bent area of the crimp region had a radius of curvature ($R_1$) of 3.65 mm, and the second bent area of the crimp region had a radius of curvature ($R_2$) of 0.6 mm.

EXAMPLE 3

The cylindrical secondary battery manufactured by the method according to Example 1, was inserted into a general PET tube, excluding electrode terminals, and heat was applied to the PET tube such that the PET tube contracted.

EXAMPLE 4

The cylindrical secondary battery manufactured by the method according to Example 1, was inserted into a soft PET tube, excluding electrode terminals, and heat was applied to the PET tube such that the PET tube contracted.

COMPARATIVE EXAMPLE 4

The cylindrical secondary battery manufactured by the method according to Comparative example 1, was inserted into a general PET tube, excluding electrode terminals, and heat was applied to the PET tube such that the PET tube contracted.

COMPARATIVE EXAMPLE 5

The cylindrical secondary battery manufactured by the method according to Comparative example 2, was inserted into a general PET tube, excluding electrode terminals, and heat was applied to the PET tube such that the PET tube contracted.

COMPARATIVE EXAMPLE 6

The cylindrical secondary battery manufactured by the method according to Comparative example 2, was inserted into a soft PET tube, excluding electrode terminals, and heat was applied to the PET tube such that the PET tube contracted.

COMPARATIVE EXAMPLE 7

The cylindrical secondary battery manufactured by the method according to Comparative example 3, was inserted into a general PET tube, excluding electrode terminals, and heat was applied to the PET tube such that the PET tube contracted.

EXPERIMENTAL EXAMPLE 1

Pressure was applied to 30 batteries manufactured as described in Example 1 and Example 2 and 30 batteries manufactured as described in Comparative example 1 and Comparative example 2, while the batteries were placed upside down, until bent safety members operated, to confirm whether an electrolyte leaked before the breakage of current intercepting members. The results are indicated in Table 1 below.

TABLE 1

|  | Occurrence of leakage before breakage of current intercepting member | Occurrence of leakage after breakage of current intercepting member | Nonoccurrence of leakage |
| --- | --- | --- | --- |
| Example 1 | 0/30 | 0/30 | 30/30 |
| Example 2 | 0/30 | 0/30 | 30/30 |
| Comparative example 1 | 0/30 | 2/30 | 28/30 |
| Comparative example 2 | 0/30 | 5/30 | 25/30 |
| Comparative example 3 | 0/30 | 6/30 | 24/30 |

It can be seen from Table 1 above that the electrolyte did not leak from the batteries of Example 1 and Example 2, whereas the electrolyte leaked from two batteries of Comparative example 1, five batteries of Comparative example 2, and six batteries of Comparative example 3 before and after the breakage of the current intercepting member. Consequently, it can be seen that the batteries according to the present invention, the bent front of which was continuously bent twice in the specific condition, exhibited excellent sealability even after the breakage of the current intercepting member.

EXPERIMENTAL EXAMPLE 2

30 batteries manufactured as described in Example 3 and Example 4 and 30 batteries manufactured as described in Comparative example 4 to Comparative example 7 were charged fully with 4 A and 4.2 V, were put in an octagonal drum, and were rotated at a speed of 66 rpm for 150 minutes at 30-minute intervals, to confirm whether the impedance increased and an electrolyte leaked. The results are indicated in Table 2 below. It can be determined that the batteries exhibited excellent mechanical sealability when the impedance increase ratio was less than 10% after the drum test, and the electrolyte did not leak.

TABLE 2

|  | After 30 minutes | After 60 minutes | After 100 minutes | After 150 minutes | After 200 minutes | After 300 minutes | Nonoccurrence of leakage |
|---|---|---|---|---|---|---|---|
| Example 3 | 0/30 | 0/30 | 0/30 | 0/30 | 0/30 | 2/30 | 28/30 |
| Example 4 | 0/30 | 0/30 | 0/30 | 0/30 | 0/30 | 0/30 | 30/30 |
| Comparative example 4 | 0/30 | 0/30 | 0/30 | 2/30 | 2/28 | 3/26 | 23/30 |
| Comparative example 5 | 3/30 | 3/27 | 6/24 | 5/18 | 6/13 | 6/7 | 1/30 |
| Comparative example 6 | 0/30 | 0/30 | 2/30 | 2/28 | 4/26 | 3/22 | 19/30 |
| Comparative example 7 | 0/30 | 0/30 | 4/30 | 3/28 | 6/26 | 6/22 | 15/30 |

The test results revealed that most batteries of Example 3 and Example 4 exhibited the impedance increase ratio of less than 10% after the drum test for 150 minutes, and the electrolyte did not leak from the batteries. Also, the electrolyte did not leak from almost all batteries after the drum test for 300 minutes. It can be seen from the test results that the batteries according to the present invention were stably maintained even when an external force was applied to the batteries.

In particular, the electrolyte did not leak from all the batteries of Example 4 after the drum test for 300 minutes. Consequently, it can be seen that it was further effective to cover the outer surface of the cylindrical container using the soft PET tube, when the radii of curvatures ($R_1$ and $R_2$) are the same, in preventing the leakage of the electrolyte, at a dynamic state, such as the drum test.

On the other hand, the electrolyte leaked from all the batteries of Comparative example 4 to Comparative example 7 during the drum test for 300 minutes. Specifically, for the batteries of Comparative example 4, the crimp formed at the outer surface of the container partially broke, and the electrolyte leaked through the broken portion. For the batteries of Comparative example 5 to Comparative example 7, it was confirmed that the electrolyte leaked through a gap formed by the upward movement of the upper end of the crimp region. Especially, for the batteries of Comparative example 7, it was confirmed that the bent front ends of the batteries were severely deformed.

Consequently, the batteries of Example 3 and Example 4, the bent front ends of which were continuously bent twice and in which the outer surfaces of the cylindrical containers were covered by the PET tubes exhibited a mechanical sealability superior to the batteries of Comparative example 4 to Comparative example 7 after the dynamic drum test.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of minimizing the deformation of the crimp region, such as wrinkles, which may occur at the outer surface of the container, when forming the bent structure having the small radius of curvature, restraining the increase of the contact resistance at the connection regions, when external physical impacts, such as vibration or dropping, are applied to the battery, and preventing the leakage of the electrolyte in a device which is disposed to frequent vibrations and impacts, thereby greatly improving the safety of the cylindrical battery. Furthermore, when the outer surface of the cylindrical container is covered by the insulative film, exhibiting excellent impact absorptivity, the insulative film partially absorbs the external impacts, whereby the safety of the battery is further improved.

What is claimed is:

1. A cylindrical battery, comprising:
   a cylindrical container having an open upper end, the upper end forming a crimp region;
   an outer surface of the cylindrical container;
   an insulative film covering the outer surface of the cylindrical container, excluding electrode terminals, the insulative film made of polymer resin exhibiting an impact absorptivity;
   an electrode assembly mounted in the cylindrical container;
   a cap assembly mounted to the upper end of the container; and
   a gasket under the cap assembly,
   wherein the crimp region comprises:
      an upwardly extending portion having an upper end; and
      a radially inwardly extending portion extending from the upper end of the upwardly extending portion, the inwardly extending portion formed as a compound curve having a first end and a second end, the compound curve being arcuate along an entire length between the first and second ends, the compound curve comprising:
         a first section extending from the first end, the first section having a first radius of curvature wherein the first radius of curvature is 0.4mm to 1.5mm; and a second section extending from the first section to the second end, the second section having a second radius of curvature wherein the second radius of curvature is 3mm to 4mm.

2. The cylindrical battery according to claim 1, wherein the cylindrical container is made of any one selected from a group consisting of stainless steel, steel, aluminum, and equivalents thereof, having a thickness of 0.15 to 0.35 mm.

3. The cylindrical battery according to claim 1, wherein the crimp region has a bent front end extending from the compound curve, and the bent front end is inclined at an angle of 40 to 80 degrees from a side of the crimp region.

4. The cylindrical battery according to claim 1, wherein the crimp region has a bent front end extending from the compound curve, and the bent front end extends, by 1 to 3 mm, from a side of the crimp region.

5. The cylindrical battery according to claim 1, wherein the cylindrical container is made of any one selected from a group consisting of stainless steel, steel, aluminum, and equivalents thereof.

6. The cylindrical battery according to claim 1, wherein the first radius of curvature has a value of 0.4 to 1.5 mm, and the second radius of curvature has a value of 3 to 4 mm.

7. The cylindrical battery according to claim 1, wherein the crimp region has a bent front end extending from the compound curve, the bent front end overlying the gasket.

8. The cylindrical battery according to claim 1, wherein the crimp region surrounds the gasket at an inside of the crimp region.

* * * * *